United States Patent
Zielinski et al.

(10) Patent No.: US 12,120,204 B2
(45) Date of Patent: *Oct. 15, 2024

(54) MULTI-PROTOCOL FIELD DEVICE IN PROCESS CONTROL SYSTEMS

(71) Applicant: FISHER-ROSEMOUNT SYSTEMS, INC., Round Rock, TX (US)

(72) Inventors: Martin Zielinski, Chanhassen, MN (US); Donald R. Lattimer, Chaska, MN (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 294 days.

This patent is subject to a terminal disclaimer.

(21) Appl. No.: 17/461,511

(22) Filed: Aug. 30, 2021

(65) Prior Publication Data

US 2022/0053074 A1  Feb. 17, 2022

Related U.S. Application Data

(63) Continuation of application No. 15/594,013, filed on May 12, 2017, now Pat. No. 11,108,893.

(Continued)

(51) Int. Cl.
*H04L 69/18* (2022.01)
*G05B 19/418* (2006.01)
(Continued)

(52) U.S. Cl.
CPC .......... *H04L 69/18* (2013.01); *G05B 19/4185* (2013.01); *H04L 67/141* (2013.01);
(Continued)

(58) Field of Classification Search
CPC ................ H04L 69/18; H04L 67/141; H04L 2012/40221; H04M 1/2535;
(Continued)

(56) References Cited

U.S. PATENT DOCUMENTS

| 5,426,774 A | 6/1995 | Banerjee et al. |
| 6,215,907 B1 | 4/2001 | Kumar et al. |

(Continued)

FOREIGN PATENT DOCUMENTS

| CN | 1314255 C | 5/2007 |
| CN | 101171578 A | 4/2008 |

(Continued)

OTHER PUBLICATIONS

Examination Report for Application No. GB1817499.5, dated Mar. 18, 2022.

(Continued)

*Primary Examiner* — Ahmed Elallam
(74) *Attorney, Agent, or Firm* — MARSHALL, GERSTEIN & BORUN LLP

(57) ABSTRACT

A field device includes components to communicate with a control and/or asset management system of a process control system or with other field devices using any of several different communication protocols such as several different internet protocol (IP) protocols. This architecture allows for a single version of a field device to be provided in automation or plant control systems that use any of these communication protocols, thus saving on inventory and product development costs. Moreover, the multi-protocol field device or a system using the multi-protocol field device can manage the asset (read and write parameterized data from and to the asset) using one protocol while at the same time communicating real-time process/factory automation information using a second and different protocol. Moreover, the field device may be able to communicate to other devices including other field devices and host devices using both of these protocols or other protocols for different purposes.

52 Claims, 2 Drawing Sheets

Related U.S. Application Data

(60) Provisional application No. 62/337,160, filed on May 16, 2016.

(51) Int. Cl.
*H04L 12/40* (2006.01)
*H04L 67/141* (2022.01)
*H04M 1/253* (2006.01)
*H04W 76/10* (2018.01)
*H04W 4/80* (2018.01)

(52) U.S. Cl.
CPC ......... *H04M 1/2535* (2013.01); *H04W 76/10* (2018.02); *G05B 2219/25008* (2013.01); *G05B 2219/25428* (2013.01); *G05B 2219/31186* (2013.01); *H04L 2012/40221* (2013.01); *H04W 4/80* (2018.02); *Y02P 90/02* (2015.11)

(58) Field of Classification Search
CPC ........... G05B 2219/25008; G05B 2219/25428; G05B 2219/31186; Y02P 90/02
See application file for complete search history.

(56) References Cited

U.S. PATENT DOCUMENTS

| | | | |
|---|---|---|---|
| 6,263,487 B1 | 7/2001 | Stripf et al. | |
| 6,282,454 B1 | 8/2001 | Papadopoulos et al. | |
| 6,321,272 B1 | 11/2001 | Swales et al. | |
| 6,594,530 B1 | 7/2003 | Glanzer et al. | |
| 6,839,790 B2 | 1/2005 | Barros De Almeida et al. | |
| 6,959,356 B2 | 10/2005 | Packwood et al. | |
| 7,370,239 B2 | 5/2008 | Apel et al. | |
| 7,436,797 B2 * | 10/2008 | Shepard ................ | H04W 40/24 370/254 |
| 7,703,093 B2 | 4/2010 | Fischer et al. | |
| 7,865,251 B2 * | 1/2011 | Law .................... | G05B 23/027 700/83 |
| 7,965,664 B2 * | 6/2011 | Hodson .................. | H04W 4/18 370/328 |
| 8,046,499 B2 | 10/2011 | Seiler et al. | |
| 8,055,727 B2 * | 11/2011 | Cahill .................. | G05B 23/027 715/733 |
| 8,090,452 B2 | 1/2012 | Johnson et al. | |
| 8,112,565 B2 | 2/2012 | Russell, III et al. | |
| 8,169,974 B2 | 5/2012 | Pratt, Jr. et al. | |
| 8,229,579 B2 | 7/2012 | Eldridge et al. | |
| 8,266,308 B2 | 9/2012 | Rydberg et al. | |
| 8,266,602 B2 | 9/2012 | Hodson et al. | |
| 8,332,567 B2 * | 12/2012 | Burr .................... | G05B 19/042 710/25 |
| 8,543,741 B2 * | 9/2013 | Reynolds ............ | H04L 61/4541 710/16 |
| 8,761,196 B2 * | 6/2014 | Law ................... | H04L 41/0803 370/464 |
| 9,008,804 B2 * | 4/2015 | Junk .................... | G05B 19/042 455/66.1 |
| 9,219,760 B2 | 12/2015 | Flanders et al. | |
| 9,268,976 B2 | 2/2016 | Nystrom et al. | |
| 9,288,289 B2 | 3/2016 | Nakamura et al. | |
| 9,411,769 B2 | 8/2016 | Erni et al. | |
| 9,529,351 B2 | 12/2016 | Ismail et al. | |
| 9,578,446 B2 | 2/2017 | Baret et al. | |
| 9,596,090 B1 | 3/2017 | Osburn, III et al. | |
| 9,661,079 B2 | 5/2017 | Pulini et al. | |
| 9,693,174 B2 | 6/2017 | Ozoe et al. | |
| 9,858,805 B2 | 1/2018 | McLaughlin et al. | |
| 9,898,925 B2 | 2/2018 | Gunzert et al. | |
| 9,948,757 B2 | 4/2018 | Chassot et al. | |
| 10,015,826 B2 | 7/2018 | Kolavennu et al. | |
| 10,018,998 B2 * | 7/2018 | Ratilla ................ | G01L 27/005 |
| 10,042,793 B2 | 8/2018 | Jaraudias et al. | |
| 10,218,533 B2 | 2/2019 | Takai et al. | |
| 2002/0007229 A1 | 1/2002 | Hudson | |
| 2002/0052715 A1 | 5/2002 | Maki | |
| 2003/0023795 A1 | 1/2003 | Packwood et al. | |
| 2003/0236937 A1 | 12/2003 | Barros De Almeida et al. | |
| 2004/0249651 A1 | 12/2004 | Fischer et al. | |
| 2005/0228509 A1 | 10/2005 | James | |
| 2006/0140209 A1 | 6/2006 | Cassiolato et al. | |
| 2006/0218311 A1 | 9/2006 | Maranat et al. | |
| 2006/0282580 A1 * | 12/2006 | Russell, III ........... | G06F 13/387 710/62 |
| 2007/0280178 A1 * | 12/2007 | Hodson .................. | H04L 69/08 370/338 |
| 2008/0159280 A1 | 7/2008 | Hwang et al. | |
| 2008/0244104 A1 | 10/2008 | Clemente et al. | |
| 2009/0010204 A1 * | 1/2009 | Pratt, Jr. ........... | H04W 56/0015 370/328 |
| 2009/0083001 A1 | 3/2009 | Huisenga et al. | |
| 2010/0077111 A1 | 3/2010 | Holmes et al. | |
| 2012/0035749 A1 * | 2/2012 | Schleiss ............. | G05B 19/0428 700/79 |
| 2013/0096727 A1 | 4/2013 | Brandt et al. | |
| 2013/0132591 A1 | 5/2013 | Damith et al. | |
| 2014/0056173 A1 | 2/2014 | Nakamura et al. | |
| 2014/0107810 A1 | 4/2014 | Johnson et al. | |
| 2014/0115121 A1 | 4/2014 | Alnnadi et al. | |
| 2015/0084747 A1 | 3/2015 | McLaughlin et al. | |
| 2015/0127876 A1 | 5/2015 | Erni et al. | |
| 2016/0132444 A1 | 5/2016 | Jaraudias et al. | |
| 2016/0328351 A1 | 11/2016 | Vogt et al. | |
| 2018/0242312 A1 | 8/2018 | Gandhi et al. | |
| 2019/0191015 A1 | 6/2019 | Tessiore et al. | |

FOREIGN PATENT DOCUMENTS

| | | |
|---|---|---|
| CN | 101682546 A | 3/2010 |
| CN | 103828477 A | 5/2014 |
| CN | 104995574 A | 10/2015 |
| CN | 105409173 A | 3/2016 |
| DE | 100 29 448 A1 | 1/2002 |
| EP | 0 825 506 | 2/1998 |
| EP | 1 284 446 | 2/2003 |
| EP | 1 288 757 A1 | 3/2003 |
| EP | 1981245 | 10/2008 |
| EP | 3139233 | 3/2017 |
| JP | 2004-537820 A | 12/2004 |
| JP | 2008-176806 A | 7/2008 |
| JP | 2009-89400 A | 4/2009 |
| JP | 2016-001810 A | 1/2016 |
| WO | WO-0180494 | 10/2001 |
| WO | WO-03013104 | 2/2003 |
| WO | WO-2014/207572 A2 | 12/2014 |

OTHER PUBLICATIONS

International Search Report and Written Opinion for Application No. PCT/US2017/032389, dated Sep. 6, 2017.
Notification of the First Office Action for Chinese Application No. 201780030342.X, dated Jan. 7, 2021.
Notification of Reasons for Refusal for Japanese Application No. 2018-560151, dated Mar. 24, 2021.
Decision of Refusal for Japanese Application No. 2018-560151, dated Aug. 31, 2021.
Notification of the First Office Action for Chinese Application No. 201780030342.X, dated Dec. 6, 2021.

* cited by examiner

MULTI-PROTOCOL FIELD DEVICE IN PROCESS CONTROL SYSTEMS

RELATED APPLICATION

This application is a continuation of U.S. patent application Ser. No. 15/594,013 entitle "Multi-Protocol Field Device in Process Control Systems" filed May 12, 2017, which a regular filed case of and claims priority to U.S. Provisional Patent Application Ser. No. 62/337,160, entitled "Multi-Protocol Field Device in Process Control Systems," which was filed on May 16, 2016, the entire disclosure of which is hereby expressly incorporated by reference herein.

TECHNICAL FIELD

This patent relates generally to communications within control and monitoring systems such as those in process plants, and more particularly, to a field device that is capable of communicating within a plant or with different plant automation systems using various different communication protocols.

BACKGROUND

Process or factory automation systems typically use one of several different industrial communication protocols when providing communications between controllers, input/output devices and field devices, such as Foundation™ Fieldbus protocol, the HART® protocol (such as the HART-IP protocol, the WirelessHART protocol), the Profibus protocol, the CAN protocol, the Modbus protocol, etc. Because the design and implementation of the automation system is tightly coupled with the communication protocol that is used, field devices used within the plant must communicate using the designated protocol to successfully integrate with the automation system. This architecture forces the field device manufacturer to make several versions of a field device available to customers to successfully participate in the automation marketplace, which leads to the need to have different drawings, user manuals, parts, inventory, etc., for essentially the same field device. Moreover, because field devices use only one protocol, the same field device is not easily transportable across or easily used within different plants or different plant automation systems.

SUMMARY

A field device includes components to communicate with a control and/or asset management system of a process control system, an automation system, a factory control system, etc., using any of several different communication protocols such as several different Internet protocol (IP) protocols. This architecture allows for a single version of a field device to be provided in automation or plant control systems that use any of these communication protocols, thus saving on inventory and product development costs. Moreover, the multi-protocol field device or a system using the multi-protocol field device can manage the asset (read and write parameterized data from and to the asset) using one protocol while at the same time communicating real-time process/factory automation information using a second and different protocol. For example, a control system may use a protocol such as Ethernet/IP for real-time data while at the same time use another protocol such as HART-IP to manage the device assets. Moreover, the field device may be able to communicate to other devices using both of these protocols or other protocols for different purposes.

In one case, a field device adapted to be connected to a communication network link includes a communication interface for connecting the field device to the communication network link, a device application unit that converts one or more process measurements to parameterized data or that converts parameterized data to one or more physical actions, a first communication unit associated with a first communication protocol that performs communications via the communication network link using the first protocol, and a second communication unit associated with a second communication protocol different from the first communication protocol that performs communications via the communication network link using the second protocol. Each of the communication units may be associated with or be configured as layers within an OSI communication model, such as parts of different data link layers, network layers, transport layers, session layers, presentation layers, or application layers, for example, of a communication system using a common physical layer within the OSI communication model.

The communication interface may be coupled to the first and second communication units and may include a multiplexer, such as a transport control protocol (TCP) multiplexer, to multiplex signals from the first and second communication units onto the communication network link and to provide communications in the first communication protocol arriving on the communication network link to the first communication unit and to provide communications in the second communication protocol arriving on the communication network link to the second communication unit.

The first communication protocol may be a first internet protocol (IP) and the second communication protocol may be a second internet protocol (IP) different than the first internet protocol (IP). If desired, the first internet protocol may be a generic communication internet protocol, such as an Ethernet/IP protocol or a Profinet protocol, and the second internet protocol may be a process control internet protocol, such as a HART-IP protocol or a Foundation Fieldbus protocol.

The field device may further include one or more sensors coupled to the device application for detecting a process condition to produce a process measurement and/or the field device may include one or more control mechanisms or apparatus coupled to the device application for performing one or more physical actions to control one or more process variables. The sensor may generate a process variable measurement that may be converted to parameterized data and the control apparatus may convert parameterized data (e.g., a digital control signal) to a current or voltage signal for performing the physical action and to control a process variable based on parameterized data from the device application. The control apparatus may be an actuator, such as a hydraulic or electrical actuator, or some other element that performs a physical movement of an element within the field device, another device or the plant.

In one example, the first communication unit may perform device management communications using the first communication protocol and the second communications unit may perform process control communications using the second communication protocol. The process control communications may include communications of real time process measurement or control signals for use in controlling a process, and these communication signals may be sent at a rate of 50 milliseconds or faster, at a rate of 10 milliseconds or faster or at other rates. The device management communications may include one or more of alarm signals, device data request signals, or device configuration signals and these communication signals may be sent at a rate of 50 milliseconds or slower, 500 milliseconds or slower, or between 500 and 1000 milliseconds, for example. The process control and/or the device management communication signals may be sent in a non-periodic manner or in a periodic manner, if desired.

The field device or a host device connected to the field device may further include a memory that stores communication protocol configuration data for multiple different communication protocols and one or more of the first and second communication units may be configurable with the communication protocol configuration data stored in the memory to perform communications with respect to the stored and configured communication protocol. A user that interacts with a host device or another application executed on a host device may cause the host device to send messages to the field device to configure the communication protocol (s) used by the field device based on the communication protocol configuration data. In one case, the configuration data may be different communication or application layers that use different communication protocols, and the host device or an application within a host device may configure the field device using the communication protocol configuration data by instructing the field device to use a particular communication or application layer associated with a particular communication protocol for particular communications. As will be understood, the communication protocol configuration data may include data related to sending messages or otherwise communicating using the protocol, such as definitions of packet sizes and packet formats, commands, etc.

If desired, the first or second communication unit may perform voice communications using a voice and/or video over internet protocol and the field device may further include a sound and/or video detection and transmission unit coupled to the one of the first or second communication units and/or may include an audio and/or video communication port for connection to an external audio and/or video device. Either or both of the first or second communication protocols may be a wired or a wireless communication protocol.

In another case, a method of performing field device communications over a communication network link includes establishing a communication connection between the field device and the communication network link, converting, via a processor on the field device, one or more process measurements to parameterized data or parameterized data to a control signal(s) to cause a physical action at the field device, performing communications over the communication network link via a first communication unit in the field device using a first communication protocol, and performing communications over the communication network link via a second communication unit at the field device using a second communication protocol different from the first communication protocol.

Performing communications via the first and second communication units may include multiplexing signals from the first and second communication units onto the communication network link, providing communications in the first communication protocol arriving on the communication network link to the first communication unit and providing communications in the second communication protocol arriving on the communication network link to the second communication unit.

The method may further include generating a process measurement via a sensor on the field device or performing a physical action via an actuator on the field device. Additionally, the method may include performing device management communications using the first communication protocol and performing process control communications using the second communication protocol. The method may further include storing configuration data for multiple different communication protocols in a configuration memory of the field device or in an external device such as a host device, and enabling a host device (e.g., an application within a host device or a user at the host device) to configure one or both of the first and second communication units with the configuration data stored in the memory to perform communications. The method may also include performing voice and/or video communications using one of the first or second communication units.

Still further, a process control system may include a communication link associated with a communication network, one or more host devices communicatively coupled to the communication link, and one or more field devices. Each of the one or more field devices includes a communication interface for connecting the field device to the communication link, a device application unit that converts one or more process measurements to parameterized data or that converts parameterized data to one or more physical action control signals, a first communication unit associated with a first communication protocol that performs communications via the communication network link using the first protocol, and a second communication unit associated with a second communication protocol different from the first communication protocol that performs communications via the communication link using the second protocol.

Still further, a method of performing communications within a process control system includes communicatively coupling a field device to one or more other devices such as host devices or other field devices, via a communication link associated with a communication network, communicating first data between one of the one or more other devices and the field device using a first communication protocol, including using a first communication unit in the field device to perform communications using the first communication protocol, and communicating second data between one of the one or more other devices and the field device using a second communication protocol that is different than the first communication protocol, including using a second communication unit in the field device to perform communications using the second communication protocol.

Likewise, a field device adapted to be connected to a communication network link includes a communication interface for connecting the field device to the communication network link, a device application unit that converts one or more process measurements to parameterized data or that converts parameterized data to one or more physical actions, a configurable communication unit that may be configured to use a first communication protocol or a second communication protocol different than the first communication protocol to perform communications via the communication network, and a communication protocol configuration memory storing communication protocol configuration data associated with one of the first or second communication protocols for use by the communication unit to communicate using the first or the second communication protocol.

DETAILED DESCRIPTION

With the advent of industrial Ethernet, many industrial communication protocols now share the same transport layers of the communication protocol stack to carry their application layer messages. By implementing multiple application layers or other open system interconnection (OSI) model layers in a single field device using industrial Ethernet, for example, the choice of which application protocol to use can be made in the field when the field device is connected to the automation system, allowing for the same field device to be used on or with many different systems. It is also possible to use such a field device to simultaneously communicate with multiple host systems using different industrial communication protocols, such as Foundation Fieldbus, HART, Profibus, etc.

Figure 1:
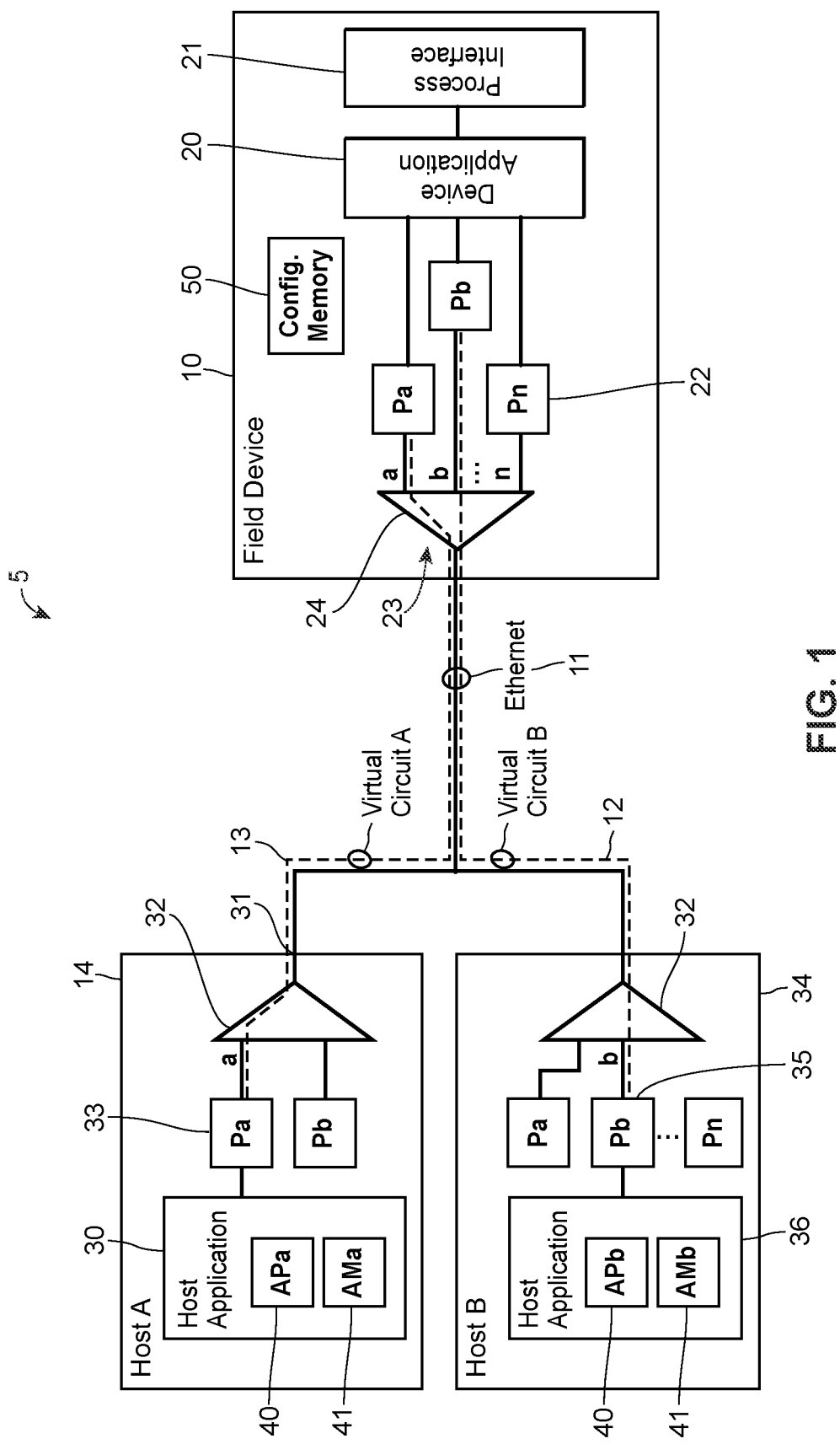
FIG. 1 depicts a communication network having a multi-protocol field device connected to multiple different host devices via a network link using several different communication protocols.

FIG. 1 illustrates an example communication system 5 having a multi-protocol field device 10 that communicates via a communication network link 11 with multiple other devices, which in this case are illustrated as other host devices 14 and 34 (Host A and Host B) within the system 5, using different process plant or other industrial communication protocols. It will be noted however, that the devices 14 and 34 could be other field devices or that other field devices 10 and even other host devices could be connected to the network 11 and communicate with the field device 10 illustrated in FIG. 1 either at the same or at different times, using the multi-protocol communications described herein. In particular, as illustrated in FIG. 1, the field device 10 includes a device application 20 that operates to convert one or more process measurements to parameterized data or that converts parameterized data to one or more actuator actions through a process interface 21. While not shown specifically in FIG. 1, the field device 10 may be a transmitter and, as such, the process interface 21 may include hardware and/or firmware, such as one or more sensors, for determining a process condition to obtain one or more process measurements (e.g., an indication of a process variable value), such as a temperature sensor, a pressure sensor, a flow sensor, a level sensor, etc. The field device 10 may also or instead be a control device and the process interface 21 may include hardware and/or firmware that produces one or more control signals that take or cause some physical action to control one or more process variables in the plant based on parameterized data in the form of digital control signals, such as opening or closing a valve, moving an actuator or other element, etc. In this case, the field device 10 may produce a control signal as a current or voltage signal that drives an actuator (such as a hydraulic or electrical actuator) or other control device, or may be a valve or other device that includes an actuator. Of course, the field device 10 could include both types of hardware and/or firmware including sensors and actuators or other physical control operators.

Moreover, the field device 10 has a communication layer, circuit, or application that implements one or more industrial communication protocols 22, labeled as $P_a$-$P_n$. Still further, the field device 10 includes a network communication interface 23 such as an Ethernet interface or a Profinet interface. The interface 23 may use a communication multiplexer 24 such as a transmission control protocol (TCP) multiplexer to establish one or more virtual circuits 12 and 13 (illustrated in dotted line in FIG. 1) over the common channel or link 11. The channel or link 11 may be a hardwired or a wireless communication channel. Moreover, the virtual circuits 12 and 13 may be used for different ones of the protocols $P_a$-$P_n$. The first host device 14 (Host A) includes a host application 30 and an Ethernet interface 31 with a multiplexer 32 similar to that of the field device 10. In this case, the host application 30 is connected to a communication circuit or layer 33 that uses the industrial protocol $P_a$ and that selects the virtual circuit 13 to be used for transporting information using the industrial communication protocol $P_a$, as the host device 14 may be designed to communicate using the protocol $P_a$. Likewise, the second host device 34 includes a similar configuration that selects the virtual circuit 12 for use in communicating using the industrial communication protocol $P_b$ as implemented by a communication circuit or layer 35. Also, the second host device 34 includes one or more host applications 36 which are connected to the communication circuit or layer 35 that uses the industrial protocol $P_b$ and that selects the virtual circuit 12. As noted above, the field device 10 could also or instead communicate with other field devices (not shown in FIG. 1) or to other host devices connected to the communication link 11 using the virtual circuits 12 and 13 or other virtual circuits, and/or using the same or different ones of the communication protocols $P_a$-$P_n$.

As will be understood, the field device 10 in FIG. 1 can be configured to communicate to the first host device 14 and/or to the second host device 34 (or to other devices, such as other host devices or other field devices) depending on the requirements of the application. For example, the first host device 14 may be used in the automation system of one plant using one type of communication protocol, while the second host device 34 may be used in the automation system of a second plant that uses a different communication protocol. In another case, the first and second host devices 14 and 34 may be parts of different automation systems used in the same plant or factory or may be different parts of the same automation system used in the same or multiple plants. This architecture allows the same field device 10 to be used in either or both plant or automation systems (serially or simultaneously) without modifying the firmware of the field device 10 and without needing to change the communication protocol of the different automation systems. This system 5 also enables field device 10 to more easily be moved into different plant environments or in different automation systems that use different communication protocols.

As will be understood, automation systems, such a process plant automation systems, are typically made up of several sub-systems and, as such, the host devices 14 and 34 may execute different applications associated with those different sub-systems. On the other hand, a single one of the host devices 14 and 34 may execute applications associated with the different sub-systems. In any event, one such sub-system may be or include a process/factory automation application 40 that uses real-time process information from field measurement devices to calculate positions of field actuator devices to control the plant process (e.g., a real-time control subsystem). A sub-system may include a second application 41 used to manage the configuration of or the maintenance of the field devices within the plant by reading and writing parameterized data contained in or generated by the field device and sending data request signals to the field devices to obtain this data. These types of applications are typically referred to as asset management applications. As illustrated in FIG. 1, the second host device 34 includes similar applications 40, 41 associated with control and maintenance systems of a different system (e.g., a different plant or automation system in the same plant).

The use of TCP/IP protocols over industrial Ethernet allows multiple simultaneous connections or virtual circuits to be established between the field device 10 of FIG. 1 and the automation systems (such as those associated with host device 14 and host device 34 and/or other field devices) using different communication protocols or formats, allowing for multiple application layers to be used at the same time. This architecture allows the field device 10 to use one virtual circuit to communicate with one host 14 with one application 40 containing the process/factory automation application using a protocol such as an Ethernet/IP protocol or a Profinet protocol, to name but a few, and a second virtual circuit to simultaneously communicate with a second host 32 containing an asset management system 41 using a different protocol such as a HART-IP protocol or a Foundation Fieldbus protocol. As noted above, the applications 40 and 41 for the same automation system could be stored and executed in the same host device 14 or 34 and the communications using the various different protocols over the network link or channel 11 may be implemented between the same two devices (a host 14 or 34 and the field device 10) for each protocol. However, applications within multiple different host devices (or other field devices) could use the same protocol to communicate with the field device 10 and each host device 14 and 34 (or other field device) could include multiple applications that use different protocols to communicate with the field device 10. In this case, the interfaces of the host devices 14, 34 (and other field devices) will support each of the multiple communication protocols associated with the applications stored and executed therein.

In one case, the field device 10 in an industrial process control network or the factory automation network uses Ethernet to simultaneously communicate with the automation system using two different communication protocols. One Ethernet based protocol may be used, for example, to communicate the real-time/run-time process/factory automation information to the automation system, while a second Ethernet based protocol in the same field device 10 may be used to communicate the asset management information to the device management system of automation system.

In still another case, the field device 10 is capable of selecting from several industrial communication protocols for communication of asset management or process/factory automation information and/or of simultaneously communicating over Ethernet with one or more process or factory automation systems using different industrial communication protocols. The field device 10 includes a first communication unit $P_a$, for example, that performs device management communications using the first communication protocol and a second communications unit $P_b$, for example, that performs process control communications using the second communication protocol. If desired, the various communication units $P_a$-$P_n$ may be associated with and/or executed as part of different application layers executed in the field device. For example, each of the communication units $P_a$-$P_n$ may be associated with or be configured as layer within an OSI communication model, such as parts of different application layers or different transport layers, for example, of a communication system using a common physical layer within the OSI communication model. Of course, the communication units $P_a$-$P_n$ may be implemented as parts of different data link layers, network layers, transport layers, session layers, presentation layers, or application layers, for example, of a communication system using a common physical layer within the OSI communication model. In other cases, the communication units $P_a$-$P_n$ may be implemented as parts of different network layers, transport layers, session layers, presentation layers, or application layers, for example, of a communication system using a common physical layer and data link layer within the OSI communication model. Still further, the communication units $P_a$-$P_n$ may be implemented as parts of different transport layers, session layers, presentation layers, or application layers, for example, of a communication system using a common physical layer, data link layer, and network layer within the OSI communication model. In yet another case, the communication units $P_a$-$P_n$ may be implemented as parts of different session layers, presentation layers, or application layers, for example, of a communication system using a common physical layer, data link layer, network layer, and transport layer within the OSI communication model. In still another case, the communication units $P_a$-$P_n$ may be implemented as parts of different presentation layers, or application layers, for example, of a communication system using a common physical layer, data link layer, network layer, transport layer, and session layer within the OSI communication model. On the other hand, the communication units $P_a$-$P_n$ may be implemented as parts of different application layers of a communication system using a common physical layer, data link layer, network layer, transport layer, session layer, and presentation layer within the OSI communication model.

In more particular examples, the process control communications may include communications of real time process measurement or control signals for use in controlling a process and may be sent over the network 11 at a rate of 50 milliseconds or faster (slow control) or at a rate of 10 milliseconds or faster (fast control). Of course other rates could be used as well or instead. Additionally, the device management communications may include one or more of alarm signals, device data request signals, device configuration signals, historical or trend data stored in the device, or other typical asset management signals. If desired, the device management communications may be sent at a rate of 50 milliseconds or slower, 500 milliseconds or slower, between 500 and 1000 milliseconds, or any other rate, which may be the same as or different than the rate used for the process control communication signals. Communications using the different protocols may be asynchronous with respect to each other. Likewise, the process control communications and/or the device management communications may be sent in a periodic or a non-periodic manner. Of course, the use of process control communications and device management communications for the separate protocol communications is but one example, and other types of communications could be applied to the different protocols. Likewise, if desired, the two separate or different protocols could be used to send the same types of signals, such as process control signals or device management signals. For example, a first field device 10 could be connected to the network communication link 11 and communicate control signals using a first protocol and a second field device 10 could be connected to the link 11 and communicate control signals using the second protocol. The field devices (if they implement two or protocol communications) could receive and decode the communications of the other field devices 10 (which could be multi-protocol field devices or traditional single protocol field devices) and of one or more host devices 14 and/or 34. Likewise, each of the host devices 14, 34 may implement a control application for a particular control sub-system, and may receive and decode both types of protocol signals to perform control in the same control sub-system. If desired, different control applications may be executed in different ones of the host devices 14 and 34 or in the same host device 14 or 34 (which may be controllers) and these different control applications may use the different protocols to perform control.

As another example, the field device 10 may use this multi-protocol capability to perform other types of communications within a plant in additional to process control communications or device management communications, such as voice and/or video over Ethernet communications. In this case, one of the communication units $P_a$-$P_n$ of the field device 10 may perform voice and/or video communications using a voice over IP or other communication protocol designed for that purpose. For example, many asset management tasks require communications between an instrumentation technician in the field near the asset and the personnel in the control room. Walkie-talkies are often used for this purpose. TCP/IP makes it possible to transport audio/video and process/factory automation data streams on the Ethernet network simultaneously. If an exterior physical port is made available at the field device 10 for connection of an audio/video communication device, the need for external communication devices like walkie-talkies and cell phones could be eliminated. This connection could be made available directly on the field device 10 or at a junction box near the field device 10 and the field device 10 may use the techniques described herein to perform voice or video over IP communications over one or more virtual circuits using one of the supported industrial protocols. In another case, the field device 10 itself may include a sound and/or video detection and/or display or transmission unit coupled to the one of the first or second communication units $P_a$-$P_n$ in the field device 10, or may include an audio and/or video communication port for connection to an external audio and/or video capture and/or display device.

Still further, the system 5 described herein, or the various devices therein, may incorporate a Bluetooth or other near field communication protocol headset connection. For example, a wireless connection, such as Bluetooth, could be used to connect a headset and/or a camera to the Ethernet network 11 for providing communications between the personnel in control room and those in the field over the process plant network 11. A wireless connection such as Bluetooth could also be used to connect a handheld field maintenance tool to the field device 10 so that calibration/configuration parameters could be set without opening the field device with a traditional wired connection.

In another case, the communication techniques described herein may incorporate or be used to perform thin-client mobile worker device communications. For example, using the multi-channel communication capabilities of TCP/IP, information between a thin-client terminal device and the control room automation system (e.g., user interface data) could be transported over the same Ethernet communication network 11 as the process/factory automation data. This architecture may allow some tasks taking two people today to be performed by a single person in the field.

Of course, as noted above, the first communication protocol may a first internet protocol (IP), such as Ethernet/IP or Profinet, and the second communication protocol may be a second internet protocol (IP), such as HART-IP or Foundation Fieldbus, different than the first internet protocol (IP). In one example, the first internet protocol may be a generic communication internet protocol (such as Ethernet or Profinet) used in many different types of computer networks, and the second internet protocol may be a process control internet protocol, used in or designed for process control communications, such as HART or Fieldbus communications. As also noted above, the field device 10 may use or support more than two communication protocols, such as three, four, five, etc.

In another case, the field device 10 may further include a memory 50, such as a configuration memory, that stores communication protocol configuration data for one or multiple different communication protocols, such that one or more of the first and second communication units $P_a$-$P_n$ is configurable with the communication protocol configuration data stored in the memory 50 to perform communications with respect to the stored and configured communication protocol. In this case, the field device 10 may be configured by a host device, such as a configuration application 41 running in a host device 14, 34, to communicate using one or more of the stored protocols. In particular, one or more of the communication units $P_a$-$P_n$ may be configured to communicate using the same or different protocols at the factory, and the configuration application 41 may connect to the field device 10 via one of the preconfigured communication units $P_a$-$P_n$ and access data in the configuration memory 50 of the field device 10 to determine the particular protocols to which the field device 10 or to which one or more of the communication units $P_a$-$P_n$ of the field device 10 can be configured. The configuration application 41 may then configure one or all of the communication units $P_a$-$P_n$ using the communication protocol configuration data stored in the configuration memory 50 to communicate over the network link 11. The configuration application 41 may additionally specify or configure the types of data (within the field device 10) to communicate using each of the communication units $P_a$-$P_n$ or the virtual circuits (e.g., 12 and 13) or other applications to which each of the communication units $P_a$-$P_n$ should connect when communicating. Of course, if desired, one or more of the communication units $P_a$-$P_n$ can be fixed or static in the protocol it uses, while one or more of the other communication units $P_a$-$P_n$ may be configurable. Likewise, if desired, the configuration memory 50 may store communication protocol configuration data for any number of protocols and can support more protocols than there are communication units $P_a$-$P_n$, if desired. Likewise, the protocol configuration data may be updated as new protocols are designed or as protocols are updated. Still further, the communication protocol configuration memory 50 may be stored or located in the host device 14 and/or 34 or some other device and may be used by the configuration application 41 to configure the field device 10. Thus, the field device 10 does not need to have the configuration memory 50 disposed therein. Moreover, in one example, the configuration data 50 may be communication layers or application layers that use different communication protocols, and the host device or an application within a host device may configure the field device 10 using the configuration data by instructing the field device 10 to use a particular communication or application layer associated with a particular communication protocol.

Still further, while the field device 10 is illustrated and described herein as including a plurality of communication units $P_a$-$P_n$, any or all of which can be configurable to use one of any number of different protocols, the field device 10 could include only one communication unit $P_1$ which could be configurable to use different communication protocols at different times. In this case, the field device 10 can be manufactured to be able to be used in many different types of networks or systems that use many different protocols, but the field device 10 can only communicate using a single protocol at any particular time.

Figure 2:
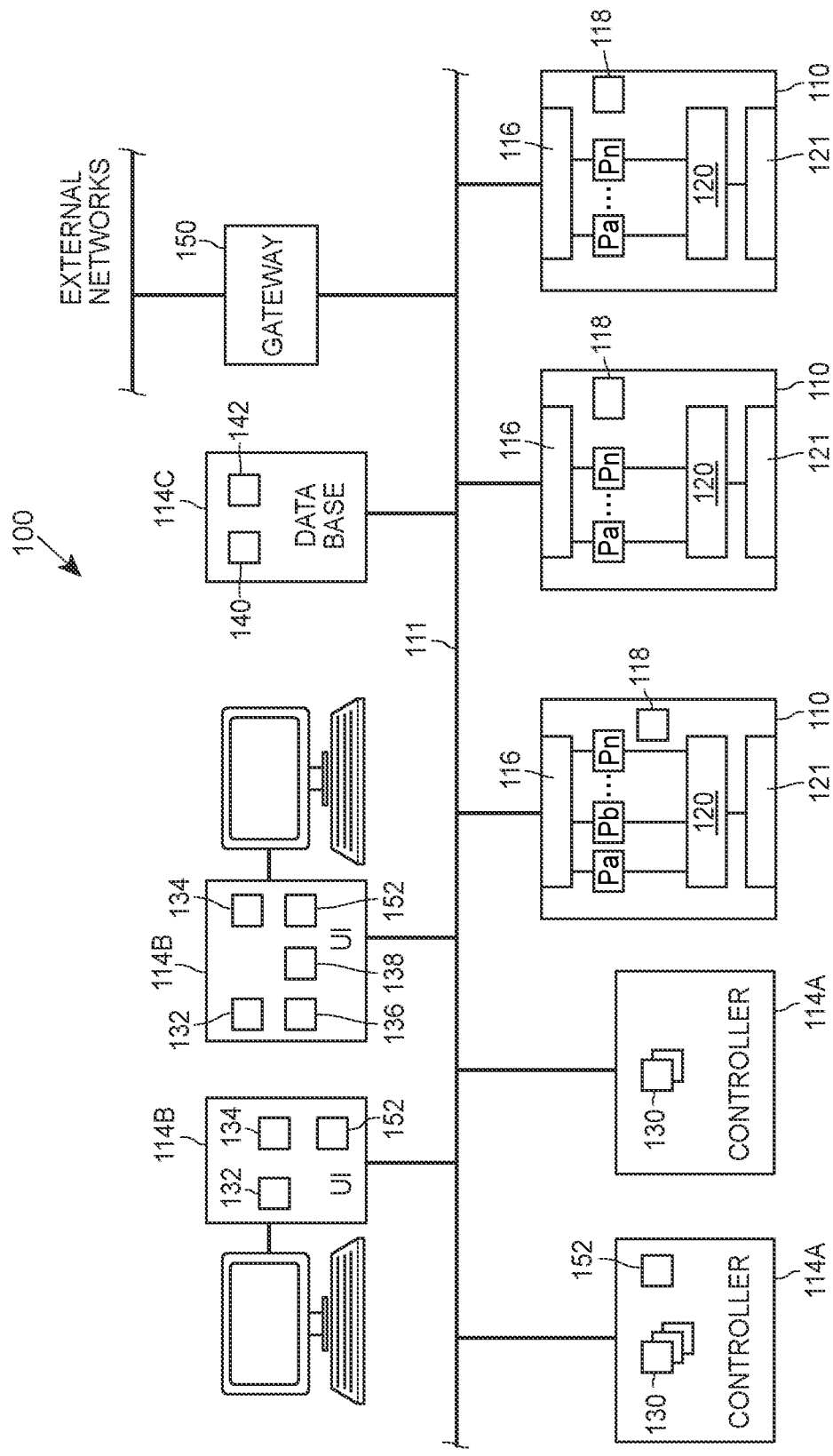
FIG. 2 depicts a process control network that may be used in a process plant, for example, to perform communications between multiple field devices and each other and one or more host devices using multiple communication protocols over a single communication network or network link.

FIG. 2 illustrates a process plant system 100 in which a plurality of multi-protocol field devices 110 are connected through a network link 111 to multiple host devices 114, which may be, for example, process controllers, user interfaces or workstations, databases, such as big data appliances, data historians, configuration databases, etc. As illustrated in FIG. 2, each of the field devices 110 includes one or more communication units $P_a$-$P_n$, which may be configurable, a network interface 116, a configuration memory 118, a device application 120, and sensor and/or control hardware and/or firmware 121. Here, one or more of the host devices 114A may be process controller devices which run or execute one or more control routines or control applications 130, one or more of the host devices 114B may be servers or user workstations that execute device or control system management applications 132, configuration applications 134, data analytics applications 136, data storage applications 138 or other display applications. Still further, one or more of the host devices 114C may be data storage devices that run or execute data storage applications 140 and data analytic applications 142, such as data historians, big data appliances, etc. The communication network link or network 111 may be coupled, via gateway devices 150 to other networks that may use the same or different communication protocols than the network 111. These other networks may be associated with other plants, other process control systems, business systems, cloud based systems, etc.

As will be noted, the system 100 of FIG. 2 illustrates one example of a process control system having a communication link 111 associated with communication network, one or more host devices 114 communicatively coupled to the communication link 111 and one or more field devices 110 communicatively coupled to the communication link 111. Each of the field devices 110 includes a communication interface 116 for connecting the field device 110 to the communication link 111, a device application unit 120 that converts one or more process measurements to parameterized data and/or that converts parameterized data to one or more physical action control signals, and one or more communication units P, including a first communication unit $P_a$ associated with a first communication protocol that performs communications via the communication network link 111 using the first communication protocol and a second communication unit $P_b$, for example, associated with a second communication protocol different from the first communication protocol that performs communications via the communication network link 111 using the second communication protocol As noted above, the communication interface 116 for the field device 110 is coupled to the first and second communication units $P_a$-$P_n$ and includes a multiplexer 116 to multiplex signals from the first and second communication units $P_a$-$P_n$ onto the communication link 111 and to provide communications in the first communication protocol on the communication link 111 to the first communication unit $P_a$ and to provide communications in the second communication protocol on the communication link 111 to the second communication unit $P_b$, for example.

One of the one or more field devices 110 includes a sensor 121 coupled to the device application 120 for detecting a process condition to produce a process measurement and another one of the one or more field devices 110 includes a control apparatus 121 coupled to the device application 120 for performing the physical action to control a process variable.

The process control system 100 of FIG. 2 further includes first and second applications stored in and executed in one or more of the one or more host devices 114, wherein the first communication unit $P_a$ of one of the field devices 110 performs communications with the first application using the first communication protocol and the second communication unit $P_b$, for example, performs communications with the second application using the second communication protocol. If desired, one of the first and second applications is a process control application 130 that performs on-line control activities, and a second one of the first and second applications is a device or plant management application 132, 134, etc. that performs device or plant management activities. Still further, one of the applications may be a voice over internet or video over internet application 152 that communicates voice and/or video signals over the communication link between a field device 110 and a user workstation 114B, for example.

The host devices 114 may also support multi-protocol communications. As an example, a first one of the host devices 114 includes a first host device communication interface 160 that communicates with the first communication unit $P_a$ of one of the field devices 110 using the first communication protocol and a second one of the host devices 114 includes a second host device communication interface 160 that communicates with the second communication unit $P_b$, for example, of the one of the field devices 110 using the second communication protocol. The first and second applications may communicate with the field device 110 or with different ones of the field devices 110 simultaneously over the communication link 111 using the first and second communication protocols.

The one or more field devices 110 may further include a memory 118 that stores configuration data for multiple different communication protocols (e.g., application layers, transport layers, etc.), and at least one of the communication units $P_a$-$P_n$ may be configurable with the configuration data stored in the memory 118 to perform communications. If desired, the one or more of the communication units $P_a$-$P_n$ is/are configurable via the communication link 111 to configure the communication protocol used by the communication units $P_a$-$P_n$. If desired, the communication protocol configuration memory 118 may instead or in addition be stored in one or more of the host devices 114, such as in the workstation or user interface device 114B associated with a configuration application.

Moreover, a method of performing communications within the process control system 100 may include communicatively coupling a field device 1110 to one or more other devices, such as host devices 114 or other field devices 110, via the communication link 111 associated with a communication network, communicating first data between one of the one or more other devices 110, 114 and the field device 110 using a first communication protocol, including using a first communication unit $P_a$ in the field device 110 to perform communications using the first communication protocol and communicating second data between one of the one or more other devices 110, 114 and the field device 110 using a second communication protocol that is different than the first communication protocol, including using a second communication unit $P_b$, for example, in the field device 110 to perform communications using the second communication protocol.

The method may further include converting a process measurement to parameterized data or converting parameterized data to a physical action control signal within the field device 110, and communicating the first and second data may include multiplexing signals from the first and second communication units $P_a$-$P_n$ onto the communication link 111 and providing communications in the first communication protocol on the communication link 111 to the first communication unit $P_a$ and providing communications in the second communication protocol on the communication link 111 to the second communication unit $P_b$. The first communication protocol may be a first internet protocol (IP) and the second communication protocol may be a second internet protocol (IP) different than the first internet protocol (IP). Generating a process measurement may include using a sensor on the field device 110 and performing the physical action may include using an actuator on the field device 110.

The communication method may include performing device management communications using the first data communicated via the first communication protocol and performing process control communications using the second data communicated via the second communication protocol. Still further, the method may include storing communication protocol configuration data for multiple different communication protocols in a configuration memory and enabling a user to configure one or both of the first and second communication units $P_a$-$P_n$ with the configuration data stored in the memory 118 to perform communications. The memory 118 may be in a field device 110 or in a host device 114 or an another device communicatively connected to the network 111.

The method may include simultaneously communicating the first data and the second data over the communication link 111 and simultaneously communicating the first data and the second data over the communication link 111 may include interleaving messages of the first data in the first communication protocol with messages of the second data in the second communication protocol on the communication link 111 or using different channels on the network link 111. The method may include using packet based messaging protocols on the communication link 111. In another case, simultaneously communicating the first data and the second data over the communication link 111 may include using a first channel on the communication link 111 to communicate the first data and using a second channel on the communication link 111 to communicate the second data. The method may include performing voice communications using one of the first or second communication units $P_a$-$P_n$. The method may also include performing communications between the field device 110 and a first application in one of the one or more host devices 114 using the first communication protocol and performing communications between the field device 110 and a second application in one of the one or more host devices 114 using the second communication protocol.

The method may also include configuring the communication protocol used by one of the first and second communication units $P_a$-$P_n$ in the field device 110. Still further, the method may include executing a process control routine 130 within one of the one or more host devices 114A for controlling a process using the field device 110 and using the first or second communication protocol to send control signals between the field device 110 and the control routine 130. The method may also include executing a user interface routine 132 within one of the one or more host devices 114B and using the first or second communication protocol to send user interface signals between the field device 110 and the user interface routine 132. The method may also include executing a database storage routine 140, 142 within one of the one or more host devices 114C and using the first or second communication protocol to send data storage signals between the field device 110 and the database storage routine 140, 142.

Any or all of the systems, methods, and techniques disclosed herein may be utilized in any process plant or process control system that is configured to control or monitor a process in real-time. Moreover, as used herein, a "devices," "field devices," or "equipment," generally refers to a physical element or component which may or may not be directly utilized during control of the process or portion thereof, but nonetheless may be ordered with other equipment pieces and/or process elements with respect to the control or flow of the process.

When implemented in software, any of the applications, routines, blocks, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, such as computer processors, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The invention claimed is:

1. A field device comprising:
   a communication interface for connecting the field device to communication network link of a process control system;
   a first communication circuit associated with a first communication protocol that performs communications via the communication interface using the first protocol; and
   a second communication circuit associated with a second communication protocol different from the first communication protocol that performs communications via the communication interface using the second protocol.

2. The field device of claim 1, wherein the communication interface is coupled to the first and second communication circuits and includes a multiplexer to multiplex signals from the first and second communication circuits or applications onto the communication network link and to provide communications in the first communication protocol arriving on the communication network link to the first communication circuit and to provide communications in the second communication protocol arriving on the communication network link to the second communication circuit.

3. The field device of claim 2, wherein the multiplexer is a transmission control protocol (TCP) multiplexer.

4. The field device of claim 1, wherein the first communication protocol is a first internet protocol (IP) and the second communication protocol is a second internet protocol (IP) different than the first internet protocol (IP).

5. The field device of claim 4, wherein the first internet protocol is a generic communication internet protocol and the second internet protocol is a process control internet protocol.

6. The field device of claim 5, wherein the first internet protocol is an Ethernet/IP protocol or a Profinet protocol and the second internet protocol is a HART-IP protocol or a Foundation Fieldbus protocol.

7. The field device of claim 1, further including one of a sensor for detecting a process condition to produce a process measurement or a control apparatus for generating a control signal for performing the physical action to control a process variable.

8. The field device of claim 1, further including a control apparatus for generating a control signal for performing a physical action, to thereby control a process variable based on parameterized data.

9. The field device of claim 8, wherein the control apparatus is an actuator.

10. The field device of claim 8, wherein the control apparatus is an electric or a hydraulic actuator that performs physical movement of an element.

11. The field device of claim 1, further including a sensor for detecting a process condition to produce a process measurement.

12. The field device of claim 1, wherein the first communication circuit performs device management communications using the first communication protocol and the second communication circuit performs process control communications using the second communication protocol.

13. The field device of claim 12, wherein the process control communications include communications of real time process measurement or control signals for use in controlling a process.

14. The field device of claim 13, wherein the process control communications are sent at a period of 50 milliseconds or faster.

15. The field device of claim 13, wherein the process control communications are sent at a period of 10 milliseconds or faster.

16. The field device of claim 12, wherein the device management communications include one or more of alarm signals, device data request signals, or device configuration signals.

17. The field device of claim 12, wherein the device management communications are sent at a period of 500 milliseconds or slower.

18. The field device of claim 12, wherein the device management communications are sent in a non-periodic manner.

19. The field device of claim 1, further including a memory that stores communication protocol configuration data for multiple different communication protocols and wherein one or more of the first and second communication circuits is configurable with the communication protocol configuration data stored in the memory to perform communications with respect to the stored and configured communication protocol.

20. The field device of claim 1, wherein one of the first or second communication circuits performs voice communications.

21. The field device of claim 20, further including an audio and/or video communication port coupled to the one of the first or second communication circuits.

22. The field device of claim 20, wherein the one of the first or second communication circuits performs voice-over-internet communications.

23. The field device of claim 20, wherein the other one of the first or second communication circuits performs process control signal communications.

24. The field device of claim 20, further including an audio and/or video communication port for connection to an audio and/or video device.

25. The field device of claim 1, wherein one of the first or second communication protocols is a wireless communication protocol.

26. A method of performing field device communications over a communication network link comprising:
    establishing a communication connection between a field device and the communication network link via a communication interface of the field device;
    performing communications over the communication network link via the communication interface and via a first communication circuit within the field device using a first communication protocol; and
    performing communications over the communication network link via the communication interface and via a second communication circuit within the field device using a second communication protocol different than the first communication protocol.

27. The method of claim 26, wherein performing communications via the first and second communication circuits includes multiplexing signals from the first and second communication circuits onto the communication network link and providing communications in the first communication protocol arriving on the communication network link to the first communication circuit and providing communications in the second communication protocol arriving on the communication network link to the second communication circuit.

28. The method of claim 27, wherein multiplexing includes multiplexing signals using a transmission control protocol (TCP).

29. The method of claim 27, wherein the first communication protocol is a first internet protocol (IP) and the second communication protocol is a second internet protocol (IP) different than the first internet protocol (IP).

30. The method of claim 29, wherein the first internet protocol is a generic communication internet protocol and the second internet protocol is a process control internet protocol.

31. The method of claim 26, further including generating the process measurement via a sensor on the field device or performing a physical action via an actuator on the field device.

32. The method of claim 26, further including performing device management communications using the first communication protocol and performing process control communications using the second communication protocol.

33. The method of claim 26, further including storing communication protocol configuration data for multiple different communication protocols in a memory of the field device and enabling a host device to configure one or both of the first and second communication circuits of the field device with the communication protocol configuration data stored in the memory to perform communications.

34. The method of claim 26, including performing voice communications using one of the first or second communication circuits.

35. A process control system, comprising:
    a communication link associated with a communication network of a process control system;
    one or more field devices, each of the one or more field devices including, a communication interface for connecting the field device to the communication link;

a first communication circuit associated with a first communication protocol that performs communications via the communication interface using the first protocol; and a second communication circuit associated with a second communication protocol different than the first communication protocol that performs communications via the communication interface using the second protocol; and one or more other devices communicatively coupled to the communication link.

36. A process control system of claim 35, wherein the communication interface for the field device is coupled to the first and second communication circuits and includes a multiplexer to multiplex signals from the first and second communication circuits onto the communication link and to provide communications in the first communication protocol arriving on the communication link to the first communication circuit and to provide communications in the second communication protocol arriving on the communication link to the second communication circuit or application.

37. The process control system of claim 36, wherein the first communication protocol is a first internet protocol (IP) and the second communication protocol is a second internet protocol (IP) different than the first internet protocol (IP).

38. The process control system of claim 35, wherein one of the one or more field devices includes a sensor for detecting a process condition to produce a process measurement.

39. The process control system of claim 35, wherein one of the one or more field devices includes a control apparatus for performing a physical action to control a process variable.

40. The process control system of claim 35, wherein the one or more other devices includes one or more host devices communicatively coupled to the communication link, and further including first and second applications stored in and executed in the one or more host devices, wherein the first communication circuit performs communications with the first application using the first communication protocol and the second communication circuit performs communications with the second application using the second communication protocol.

41. The process control system of claim 40, wherein one of the first and second applications is a process control application that performs on-line control activities.

42. The process control system of claim 41, wherein the second one of the first and second applications is a device or plant management application that performs device or plant management activities.

43. The process control system of claim 40, wherein the second one of the first and second applications is voice application that communicates voice and/or video signals over the communication link.

44. The process control system of claim 40, wherein the one or more host devices includes a first host device and a second host device, and wherein the first host device includes a first host device communication interface that communicates with the first communication circuit of one of the field devices using the first communication protocol and the second host device includes a second host device communication interface that communicates with the second communication circuit of the one of the field devices using the second communication protocol.

45. The process control system of claim 40, wherein the first and second applications communicate with the field device simultaneously over the communication link using the first and second communication protocols.

46. The process control system of claim 35, wherein one of the one or more field devices further includes a memory that stores communication protocol configuration data for multiple different communication protocols, and wherein at least one of the first and second communication circuits is configurable with the communication protocol configuration data stored in the memory to perform communications.

47. The process control system of claim 35, wherein one of the first and second communication circuits is configurable via the communication link to configure the communication protocol used by the one of the first and second communication circuits.

48. The process control system of claim 35, wherein the one or more other devices includes one or more host devices communicatively coupled to the communication link and wherein one of the one or more host devices is a process controller device that executes a process control routine for controlling the process.

49. The process control system of claim 35, wherein the one or more other devices includes one or more host devices communicatively coupled to the communication link and wherein one of the one or more host devices is a user workstation.

50. The process control system of claim 35, wherein the one or more other devices includes one or more host devices communicatively coupled to the communication link and wherein one of the one or more host devices is a historian database.

51. The process control system of claim 35, wherein the one or more other devices includes one or more host devices communicatively coupled to the communication link and wherein one of the one or more host devices is a big data appliance.

52. A field device, comprising:

a communication interface for connecting the field device to a communication network link of a process control system;

a configurable communication circuit that is capable of being configured to use a first communication protocol and a second communication protocol different than the first communication protocol to perform communications via the communication network interface; and a configuration memory storing communication protocol configuration data associated with one of the first and second communication protocols for use by the configurable communication circuit to communicate using the first and the second communication protocol.

* * * * *

UNITED STATES PATENT AND TRADEMARK OFFICE
CERTIFICATE OF CORRECTION

PATENT NO. : 12,120,204 B2
APPLICATION NO. : 17/461511
DATED : October 15, 2024
INVENTOR(S) : Martin Zielinski et al.

It is certified that error appears in the above-identified patent and that said Letters Patent is hereby corrected as shown below:

In the Specification

Column 1, Line 8, "2017," should be -- 2017, now U.S. Pat. No. 11,108,893, --.

Column 1, Line 9, "which" should be -- which is --.

Column 1, Line 54, "Internet" should be -- internet --.

Column 2, Line 25, "transport" should be -- transmission --.

Column 5, Line 7, "DETALED" should be -- DETAILED --.

Column 6, Line 48, "such a" should be -- such as --.

Column 7, Line 11, "host 14" should be -- host device 14 --.

Column 7, Line 16, "host 32" should be -- host device 34 --.

Column 7, Line 16, "system 41" should be -- application 41 --.

Column 7, Line 23, "host 14" should be -- host device 14 --.

Column 8, Line 60, "two or protocol communications)" should be -- two or more communications protocol) --.

Column 9, Line 8, "additional" should be -- addition --.

Signed and Sealed this
Tenth Day of February, 2026

John A. Squires
*Director of the United States Patent and Trademark Office*

CERTIFICATE OF CORRECTION (continued)
U.S. Pat. No. 12,120,204 B2

Column 9, Line 59, "may" should be -- may be --.

Column 10, Line 50, "data 50" should be -- memory 50 --.

Column 11, Line 36, "unit 120" should be -- 120 --.

Column 11, Line 48, "protocol" should be -- protocol. --.

Column 11, Line 51, "multiplexer 116" should be -- multiplexer --.

Column 11, Line 63, "apparatus" should be -- hardware --.

Column 12, Line 10, "plant management application 132, 134," should be -- control system management application 132, configuration application 134, --.

Column 12, Line 20, "interface 160" should be -- interface --.

Column 12, Line 24, "interface 160" should be -- interface --.

Column 12, Line 47, "device 1110" should be -- device 110 --.

In the Claims

Column 14, Line 42, Claim 1 "to" should be -- to a --.

Column 16, Line 67, Claim 35 "including," should be -- including: --.

Column 17, Line 14, Claim 36 "A process" should be -- The process --.